United States Patent
Sun et al.

(10) Patent No.: US 12,315,104 B1
(45) Date of Patent: May 27, 2025

(54) METHOD AND DEVICE FOR GENERATING SATELLITE REMOTE-SENSING IMAGE WITH HIGH SPATIAL, TEMPORAL AND SPECTRAL RESOLUTIONS

(71) Applicant: NINGBO UNIVERSITY, Ningbo (CN)

(72) Inventors: Weiwei Sun, Ningbo (CN); Gang Yang, Ningbo (CN); Xiangchao Meng, Ningbo (CN); Jun Zhou, Ningbo (CN)

(73) Assignee: NINGBO UNIVERSITY, Ningbo (CN)

( * ) Notice: Subject to any disclaimer, the term of this patent is extended or adjusted under 35 U.S.C. 154(b) by 0 days.

(21) Appl. No.: 19/023,595

(22) Filed: Jan. 16, 2025

Related U.S. Application Data

(63) Continuation of application No. PCT/CN2024/094956, filed on May 23, 2024.

(30) Foreign Application Priority Data

May 16, 2023 (CN) .......................... 202310546379.5

(51) Int. Cl.
*G06T 5/00* (2024.01)
*G06T 3/40* (2006.01)
*G06T 5/50* (2006.01)

(52) U.S. Cl.
CPC .................. *G06T 3/40* (2013.01); *G06T 5/50* (2013.01); *G06T 2207/10036* (2013.01); (Continued)

(58) Field of Classification Search
CPC .... G06V 20/13; G06V 20/194; G06V 10/803; G06V 10/82; G06V 10/58;
(Continued)

(56) References Cited

U.S. PATENT DOCUMENTS

2005/0094887 A1* 5/2005 Cakir .................... G06V 20/13
382/254
2009/0226114 A1 9/2009 Choi et al.
(Continued)

FOREIGN PATENT DOCUMENTS

| CN | 113112591 A | 7/2021 |
| CN | 115984155 A | 4/2023 |
| CN | 116757925 A | 9/2023 |

OTHER PUBLICATIONS

Sun, Weiwei, et al. "A band divide-and-conquer multispectral and hyperspectral image fusion method." IEEE Transactions on Geoscience and Remote Sensing 60 (2021): 1-13.*
(Continued)

*Primary Examiner* — Li Liu
(74) *Attorney, Agent, or Firm* — Bayramoglu Law Offices LLC

(57) ABSTRACT

A method and device for generating a satellite remote-sensing image with high spatial, temporal and spectral resolutions is provided. The method includes: fusing a multispectral image with high temporal and spatial resolutions but a low spectral resolution and a hyperspectral image with a high spectral resolution but low temporal and spatial resolutions to generate a fused image with high spatial, temporal and spectral resolutions. Compared with a current spatial-temporal-spectral integrated fusion method, the proposed method is more in line with resolution characteristics of current mainstream satellite-borne remote-sensing data and can achieve high-fidelity fusion performance.

18 Claims, 3 Drawing Sheets

(52) U.S. Cl.
CPC ........... *G06T 2207/20016* (2013.01); *G06T 2207/20021* (2013.01); *G06T 2207/20221* (2013.01)

(58) Field of Classification Search
CPC ............ G06T 2207/20221; G06T 5/50; G06T 2207/10036; G06T 2207/10032; G06T 3/4053; G06T 5/00
See application file for complete search history.

(56) References Cited

U.S. PATENT DOCUMENTS

| | | | | |
|---|---|---|---|---|
| 2020/0082151 | A1* | 3/2020 | Huang | G06T 5/70 |
| 2021/0118097 | A1* | 4/2021 | Guan | H04N 1/3871 |
| 2024/0362909 | A1* | 10/2024 | Melnitchouck | G06V 10/32 |

OTHER PUBLICATIONS

X. Chen et al., "FTDN: Multispectral and Hyperspectral Image Fusion With Diverse Temporal Difference Spans," in IEEE Transactions on Geoscience and Remote Sensing, vol. 61, pp. 1-13, 2023*

Shen, Huanfeng, Xiangchao Meng, and Liangpei Zhang. "An integrated framework for the spatio-temporal-spectral fusion of remote sensing images." IEEE Transactions on Geoscience and Remote Sensing 54.12 (2016): 7135-7148.*

Li, Jun, et al. "Spatio-temporal fusion for remote sensing data: An overview and new benchmark." Science China Information Sciences 63 (2020): 1-17.*

Jun Zhou, et al., Generalized Linear Spectral Mixing Model for Spatial-Temporal-Spectral Fusion, IEEE Transactions on Geoscience and Remote Sensing, 2022, vol. 60 No. 5533216.

* cited by examiner

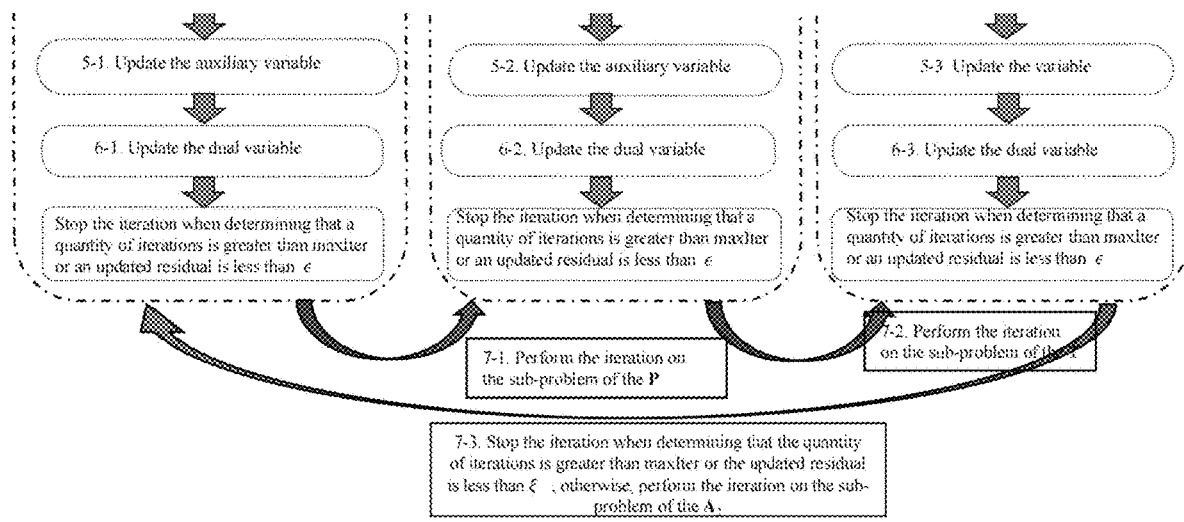
Continuous part of FIG. 2

METHOD AND DEVICE FOR GENERATING SATELLITE REMOTE-SENSING IMAGE WITH HIGH SPATIAL, TEMPORAL AND SPECTRAL RESOLUTIONS

CROSS-REFERENCE TO THE RELATED APPLICATIONS

This application is a continuation application of international patent application No. PCT/CN2024/094956, filed on May 23, 2024, which is based upon and claims priority to Chinese Patent Application No. 202310546379.5, filed on May 16, 2023, the entire contents of which are incorporated herein by reference.

TECHNICAL FIELD

The present disclosure relates to the field of optical remote-sensing images, and more specifically, to a method and device for generating a satellite remote-sensing image with high spatial, temporal and spectral resolutions.

BACKGROUND

Remote sensing has characteristics of real-time, accurate, and continuous acquisition of large-scale earth surface information, and has enormous application value. It has been widely used in various fields, such as natural resource monitoring, environmental monitoring, mineral identification, precision agriculture, and other fields. However, due to limitations of imaging sensor technologies and costs, a satellite sensor has to make a trade-off between spatial, temporal and spectral resolutions, and it is very difficult to obtain data with high spatial, temporal and spectral resolutions. This limits further application of current remote-sensing data in many fields. As a result, there is more available remote-sensing data, but a relative proportion of data that can be truly used is still low.

In current satellite remote-sensing imaging, a hyperspectral image has a high spectral resolution, but has lower spatial and temporal resolutions than a multispectral image. However, a spectral resolution of the multispectral image is relatively low, and there are generally less than ten bands. China's hyperspectral satellite ZY-1 02D was launched in 2020, and its hyperspectral sensor can capture 166 spectral bands with a spatial resolution of 30 meters, and its revisit period is 55 days. A low spatial resolution (usually 30 m) and a long revisit period (longer than 15 days) make it difficult to finely monitor a rapidly changing scenario based on existing hyperspectral satellite data. Compared with the hyperspectral sensor, a multispectral sensor typically has higher spatial and temporal resolutions. For example, the twin satellites Sentinel-2 a/b launched in 2015 and 2017 can access the earth surface with a 5-day revisit period, providing 4-band data with a spatial resolution of 10 meters. A short revisit period and a fine spatial resolution of the multispectral satellite make it possible to perform rapid monitoring with a long timing sequence, but a small quantity of bands make it difficult to accurately identify a surface feature. Remote-sensing image fusion, as an information processing technology, can systematically synthesize two or more remote-sensing images with complementary information in a same region to generate an image that provides more visual perception and computer processing information than a single image that can be obtained. The remote-sensing image fusion has become one of main means to improve a spatial/temporal/spectral resolution of a single-source satellite. However, current remote-sensing image fusion methods mainly focus on fusion of two of three resolution attributes of a remote-sensing sensor (spatial-spectral fusion, and temporal-spatial fusion). The only few spatial-temporal-spectral fusion methods are mostly used to fuse hyperspectral images having a high temporal resolution, without considering a resolution characteristic of a current satellite-borne remote-sensing image, that is, a characteristic that the spatial and temporal resolutions of the hyperspectral image are lower than those of the multispectral image.

Therefore, based on resolution characteristics of the current remote-sensing data, it is of great significance for the further application of remote sensing data to carry out the research on a multi-source remote-sensing spatial-temporal-spectral collaborative fusion method, which integrates complementary advantages of spatial, temporal and spectral resolutions of a multi-source remote-sensing image and generates image data with high spatial, temporal and spectral resolutions through fusion.

SUMMARY

In order to overcome shortcomings that a current remote-sensing image fusion method insufficiently considers resolution characteristics of current remote-sensing data and cannot fully leverage a collaborative advantage of current multi-source remote-sensing data to generate data with high spatial, temporal and spectral resolutions, the present disclosure provides a method and device for generating a satellite remote-sensing image with high spatial, temporal and spectral resolutions to obtain the data with high spatial, temporal and spectral resolutions.

According to a first aspect, a method for generating a satellite remote-sensing image with high spatial, temporal and spectral resolutions is provided, including:

step 1: obtaining a hyperspectral image $H_1$ and a multispectral image $M_1$ at a time point $T_1$, and a multispectral image $M_2$ at a time point $T_2$, and performing preprocessing to obtain an upsampled hyperspectral image $\hat{H}_1$;

step 2: based on a local linear constraint, searching for an adjacent similar full-band block $M_1(\Omega_{i,j,k})$ in the multispectral image $M_1$ to represent an image block centered at (i, j) in the multispectral image $M_2$, and obtaining a representation weight function of the similar full-band block; and sharing the representation weight function with the upsampled hyperspectral image $\hat{H}_1$ to obtain an upsampled hyperspectral image $\hat{H}^*_2 \in \mathbb{R}^{L \times W}$ at a prediction time point;

step 3: obtaining a time variation image represented as $T=\hat{H}^*_2-\hat{H}_1$ for an initialized target fused image;

step 4: decomposing a target image $X_2$ at the time point $T_2$ into an endmember matrix $E_2$ and an abundance matrix $A_2$ based on a spectral linear mixed model, where $X_2=E_2A_2$, and the target image $X_2$ is an image with high spatial, temporal and spectral resolutions;

step 5: establishing observation models of the multispectral image, the hyperspectral image, and the image with high spatial, temporal and spectral resolutions;

step 6: introducing a generalized linear mixed model, and representing the endmember matrix $E_2$ as $E_2=PeE_1$, where the symbol e represents a Hadamard product of element-by-element multiplication, P represents a time variation matrix of the target image, and $E_1$ represents an endmember matrix at the time point $T_1$;

step 7: obtaining the abundance matrix $A_2$, the time variation matrix P and a time variation image T of the target image; and step 8: obtaining the target image finally by multiplying the endmember matrix $E_1$ at the time point $T_1$ by the time variation matrix P at the time point $T_2$ element by element and then by the abundance matrix $A_2$ with high resolution: $X=(P^e E_1)A_2$.

Preferably, the step 1 includes:

step 1.1: obtaining the hyperspectral image $H_1 \in \mathbb{R}^{L \times w}$ and the multispectral image $M_1 \in \mathbb{R}^{l \times W}$ at the time point $T_1$, and the multispectral image $M_2 \in \mathbb{R}^{l \times W}$ at the time point $T_2$, where l and L represent quantities of bands, w and W represent quantities of pixels, l<L, and w<W;

step 1.2: normalizing the hyperspectral image $H_1$ and the multispectral images $M_1$ and $M_2$, and upsampling a normalized hyperspectral image $H_1$ to a spatial size of the multispectral image to obtain the $\hat{H}_1 \in \mathbb{R}^{L \times W}$; and step 1.3: folding the multispectral images $M_1$ and $M_2$ and the upsampled hyperspectral image $\hat{H}_1$ into a three-dimensional form along a spectral dimension, and splitting the three-dimensional form into $\sqrt{c} \times \sqrt{c} \times l$ full-band blocks with both a width and a height being $\sqrt{c}$ and the spectral dimension being l.

Preferably, in the step 5, the observation models of the multispectral image, the hyperspectral image, and the image with high spatial, temporal and spectral resolutions are represented as follows:

$$M_i = RX_i = RE_iA_i$$

$$H_i = X_iFS = E_iA_iFS$$

where $i \in \{1,2\}$; $X_i \in \mathbb{R}^{L \times W}$, $H_i \in \mathbb{R}^{L \times x}$, and $M_i \in \mathbb{R}^{l \times W}$ respectively represent an image with high spatial, temporal and spectral resolutions, a hyperspectral image, and a multispectral image at a time point $T_i$; $E_i \in \mathbb{R}^{L \times Q}$ and $A_i \in \mathbb{R}^{Q \times W}$ respectively represent an endmember matrix and an abundance matrix of the image with high spatial, temporal and spectral resolutions at the time point $T_i$, Q represents a quantity of endmembers, and Q<<L; and $R \in \mathbb{R}^{l \times L}$ represents a spectral downsampling matrix, and $F \in \mathbb{R}^{W \times W}$ and $S \in \mathbb{R}^{W \times w}$ respectively represent a spatial blur matrix and a spatial downsampling matrix.

Preferably, the step 7 includes:

step 7.1: separately introducing a regularization term of the abundance matrix $A_2$, a regularization term of the time variation matrix P and a regularization term of the time variation image T of the target image to obtain an energy function for a fusion problem;

step 7.2: splitting the energy function into three sub-functions corresponding to variables of the abundance matrix $A_2$, the time variation matrix P and the time variation image T, introducing a plurality of auxiliary variables for each sub-function to split the sub-function into sub-problems, and constructing an augmented Lagrangian function for each sub-problem; and step 7.3: using an alternating direction method of multipliers to perform optimal solving on the augmented Lagrangian function to obtain the abundance matrix $A_2$, the time variation matrix P and the time variation image T of the target image.

Preferably, in the step 7.1, the energy function is represented as follows:

$$\arg\min_{A_2,P,T} \frac{1}{2}\|M_2 - R(Pe\ E_1)A_2\|_2^2 + \frac{1}{2}\|D - R((Pe\ E_1)A_2 - E_1A_1)\|_2^2 +$$

$$\frac{1}{2}\|RT - D\|_2^2 + \frac{1}{2}\|T - ((Pe\ E_1)A_2 - E_1A_1)\|_2^2 + \Phi(A_2) + \Psi(P) + Y(T)$$

$$\text{s.t. } D = M_2 - M_1$$

where D represents a differential image of the multispectral images $M_2$ and $M_1$. Preferably, the step 7.1 includes:

step 7.1.1: introducing the regularization term of the abundance matrix $A_2$ of the target image, where the regularization term is a spatial smoothing constraint and represented as follows:

$$\Phi(A_2) = \frac{\lambda_A}{2}(\|H_hA_2\|_{2,1} + \|H_vA_2\|_{2,1})$$

where $H_h$ and $H_v$ represent linear operators respectively used to calculate horizontal and vertical gradients between components of adjacent pixels in a two-dimensional signal, $\|\cdot\|_{2,1}$ represents a mixed $L_{2,1}$ norm, and $\lambda_A$ represents a regularization parameter of the abundance matrix $A_2$;

step 7.1.2: introducing the regularization term of the time variation matrix P, where the regularization term is a spectral smoothing constraint and represented as follows:

$$\Psi(P) = \frac{\lambda_1}{2}\|H_\ell P\|_F^2 + \frac{\lambda_2}{2}\|P - 1_L 1_Q^T\|_F^2$$

where $H_1$ represents a differential operator in a spectral dimension direction, $1_L 1_Q^T \in \mathbb{R}^{L \times Q}$ represents a matrix with all elements in L rows and Q columns being 1, and $\lambda_1$ and $\lambda_2$ represent regularization parameters of the time variation matrix P; and step 7.1.3: introducing the regularization term of the time variation image T, where the regularization term is a low-rank constraint and represented as follows:

$$Y(T) = \lambda_T \|\mathcal{T}\|_{TNN}$$

where $\mathcal{T}$ represents a third-order tensor form of the T; $\|\cdot\|_{TNN}$ represents a tensor nuclear norm, with $$\|\mathcal{T}\|_{TNN} = \sum_{i=1}^{3} \sum_j \sigma_j(\overline{T}^{(i)}),$$

where $\sigma_j(\overline{T}^{(i)})$ represents a $j^{th}$ singular value of $\overline{T}^{(i)}$, and $\overline{T}$ is obtained by performing Fourier transform on the T; and $\lambda_T$ represents a regularization parameter of the time variation image T.

Preferably, in the step 7.2, a sub-problem of the abundance matrix $A_2$ of the target image is as follows:

$$A_2 = \operatorname*{argmin}_{A_2} \frac{1}{2}\|M_2 - R(Pe\ E_1)A_2\|_2^2 + \frac{1}{2}\|D - R((Pe\ E_1)A_2 - E_1A_1)\|_2^2 +$$

$$\frac{\eta}{2}\|T - ((Pe\ E_1)A_2 - E_1A_1)\|_2^2 + \frac{\lambda_A}{2}(\|H_hA_2\|_{2,1} + \|H_vA_2\|_{2,1})$$

where η represents a term parameter of the time variation image and is used to control a contribution of the time variation image to a model; and auxiliary variables $B_1=A_2$, $B_2=H_h(A_1)$, and $B_3=H_v(A_1)$ are introduced, $u=\text{vec}(A_2)$ is set, a symbol $\text{vec}(\cdot)$ represents a vectorization operation, and an augmented Lagrangian function for the sub-problem of the abundance matrix $A_2$ is given as follows:

$$\mathcal{L}(u, B_1, B_2, B_3, V_1, V_2, V_3)$$

$$= \frac{1}{2}\|\text{vec}(M_2) - \text{rep}_M(R(Pe\ E_1)u)\|_2^2$$

$$+ \frac{1}{2}\|\text{vec}(D) - \text{rep}_M(R((Pe\ E_1)u -)) + \text{vec}(E_1 A_1)\|_2^2$$

$$+ \frac{\eta}{2}\|\text{vec}(T) - \text{rep}_M((Pe\ E_1)u) + \text{vec}(E_1 A_1)\|_2^2$$

$$+ \lambda_A(\|B_2\|^2 + \|B_3\|^2) + \frac{\rho}{2}(\|\text{vec}(B_1) - u + V_1\|_2^2$$

$$+ \|\text{vec}(B_2) - H_h \text{vec}(B_1) + V_2\|_2^2$$

$$+ \|\text{vec}(B_3) - H_v \text{vec}(B_1) + V_3\|_2^2)$$

where a matrix $V_i$, i=1,2,3 represents a dual variable of a Lagrangian function; ρ represents a step size, where ρ>0; and $\text{rep}_M(V)$ represents a block diagonal matrix of a matrix V and means copying the matrix V along a diagonal for M times.

Preferably, in the step 7.2, a sub-problem of the time variation matrix P of the target image is as follows:

$$P = \arg\min_P \frac{1}{2}\|M_2 - R(Pe\ E_1)A_2\|_2^2 + \frac{1}{2}\|D - R((Pe\ E_1)A_2 - E_1 A_1)\|_2^2 +$$

$$\frac{1}{2}\|T - ((Pe\ E_1)A_2 - E_1 A_1)\|_2^2 + \frac{\lambda_1}{2}\|P - 1_L 1_Q\|_2^2 + \frac{\lambda_2}{2}\|H_l P\|_2^2$$

an auxiliary variable $B=PeE_1$ is introduced, and an augmented Lagrangian function for the sub-problem of the time variation matrix P is as follows:

$$\mathcal{L}(B, P, V) =$$

$$\frac{1}{2}\|M_2 - RBA_2\|_2^2 + \frac{1}{2}\|D - R(BA_2 - E_1 A_1)\|_2^2 + \frac{\eta}{2}\|T - (BA_2 - E_1 A_1)\|_2^2 +$$

$$\frac{\lambda_1}{2}\|P - 1_L 1_Q\|_2^2 + \frac{\lambda_2}{2}\|H_l P\|_2^2 + \frac{\rho}{2}(\|B - PeE_1 + V\|_2^2)$$

a sub-problem of the time variation image T of the target image is as follows:

$$\tau = \arg\min_T \frac{1}{2}\|RT - D\|_2^2 + \frac{1}{2}\|T - ((Pe\ E_1)A_2 - E_1 A_1)\|_2^2 + \lambda_T\|\mathcal{T}\|_{TNN}$$

an auxiliary variable $\mathcal{B} = \mathcal{T}$ is introduced, and an augmented Lagrangian function for the sub-problem of the time variation image T is as follows:

$$T = \arg\min_T \frac{1}{2}\|RT - D\|_2^2 + \frac{1}{2}\|T - ((PeE_1)A_2 - E_1 A_1)\|_2^2 + \lambda_T\|\mathcal{B}\|_{TNN}.$$

Preferably, in the step 2, the image block centered at the (i, j) in the multispectral image $M_2$ is represented using the adjacent similar full-band block $M_1(\Omega_{i,j,k})$ in the multispectral image $M_1$:

$$M_2(i, j) = \sum_{\Omega_{i,j,k} \in \Omega_{i,j}} \omega_{i,j,k} M_1(\Omega_{i,j,k}),$$

where $\omega_{i,j,k}$ represents a weight of a $k^{th}$ image block in the $\Omega_{i,j,k}$, and the $\omega_{i,j,k}$ is obtained based on the local linear constraint:

$$\min\|M_2(i,j) - M_1(\Omega_{i,j})\omega_{i,j}\|^2 + \lambda\|d_{i,j}\omega_{i,j}\|^2$$

s.t. $1^T \omega_{i,j} = 1$ where $\omega_{i,j}$ represents a weight corresponding to the image block $M_2(i,j)$, $\|d_{i,j} e \omega_{i,j}\|^2$ represents a regularization term of the local linear constraint, $d_{i,j}$ represents a Euclidean distance between a similar pixel and a center of $M_1(i,j)$, and λ represents a regularization term parameter; and a solution to an optimization problem of the local linear constraint is as follows:

$$\omega_{i,j} = ((C_{i,j} + \lambda \text{diag}(d_{i,j}))\backslash 1)(1^T(C_{i,j} + \lambda \text{diag}(d_{i,j}))\backslash 1)^{-1}$$

where $C_{i,j} = (M_1(\Omega_1) - M_2(i,j)^T)(M_1(\Omega_{i,j}) - 1 M_2(i,j)^T)^T$ represents a covariance matrix of the image block, diag $(d_{i,j})$ represents a diagonal matrix with $d_{i,j}$ being a diagonal element; afterwards, the weight $\omega_{i,j}$ obtained from the multispectral image is shared with the upsampled hyperspectral image $\hat{H}_1$ to generate the upsampled hyperspectral image $$\hat{H}_2^* = \sum_{\Omega_{i,j,k} \in \Omega_{i,j}} \omega_{i,j,k} \hat{H}_1(\Omega_{i,j,k})$$

at the prediction time point.

According to a second aspect, a device for generating a satellite remote-sensing image with high spatial, temporal and spectral resolutions is provided, which is configured to execute the method for generating a satellite remote-sensing image with high spatial, temporal and spectral resolutions according to any one first aspect, and includes:

a first obtaining module configured to obtain a hyperspectral image $H_1$ and a multispectral image $M_1$ at a time point $T_1$, and a multispectral image $M_2$ at a time point $T_2$, and perform preprocessing to obtain an upsampled hyperspectral image $\hat{H}_1$;

a search module configured to: based on a local linear constraint, search for an adjacent similar full-band block $M_1(\Omega_{i,j,k})$ in the multispectral image $M_1$ to represent an image block centered at (i,j) in the multispectral image $M_2$, and obtain a representation weight function of the similar full-band block; and share the representation weight function with the upsampled hyperspectral image $\hat{H}_1$ to obtain an upsampled hyperspectral image $\hat{H}^*_2 \in \mathbb{R}^{L \times W}$ at a prediction time point;

a second obtaining module configured to obtain a time variation image represented as $T = \hat{H}^*_2 - \hat{H}_1$ for an initialized target fused image;

a decomposition module configured to decompose a target image $X_2$ at the time point $T_2$ into an endmember matrix $E_2$ and an abundance matrix $A_2$ based on a spectral linear mixed model, where $X_2 = E_2 A_2$, and the target image $X_2$ is an image with high spatial, temporal and spectral resolutions;

an establishment module configured to establish observation models of the multispectral image, the hyperspectral image, and the image with high spatial, temporal and spectral resolutions;

a representation module configured to introduce a generalized linear mixed model, and represent the endmember matrix $E_2$ as $E_2=PeE_1$, where the symbol e represents a Hadamard product of element-by-element multiplication, P represents a time variation matrix of the target image, and $E_1$ represents an endmember matrix at the time point $T_1$;

a third obtaining module configured to obtain the abundance matrix $A_2$, the time variation matrix P and a time variation image T of the target image; and an obtaining module configured to obtain the target image finally by multiplying the endmember matrix $E_1$ at the time point $T_1$ by the time variation matrix P at the time point $T_2$ element by element and then by the abundance matrix $A_2$ with high resolution: $X=(P^eE_1)A_2$.

The present disclosure has following beneficial effects:

1. The present disclosure mainly focuses on fusing a hyperspectral remote-sensing image with low temporal and spatial resolutions and a multispectral remote-sensing image with high temporal and spatial resolutions. Compared with existing remote-sensing fusion methods, the present disclosure can fuse attributes of spatial, temporal and spectral resolutions at a time to generate a fused image with high spatial, temporal and spectral resolutions. In addition, a fusion task targeted by the present disclosure is more in line with resolution characteristics of current satellite-borne remote-sensing data.

2. A spatial-temporal-spectral fusion method established in the present disclosure provides a generalized fusion framework, including a time variation model and a resolution enhancement reconstruction model for a time variation image. The time variation model is used to depict and model a time variation between images, and the resolution enhancement reconstruction model accurately estimates and obtains the time variation by reconstructing a resolution-enhanced time variation image model. The time variation model and the resolution enhancement reconstruction model for the time variation image are coupled to achieve high-fidelity spatial-temporal-spectral fusion performance.

3. Based on a local linear constraint, the present disclosure represents a multispectral image $M_2$ at prediction time $T_2$ using a multispectral image $M_1$ observed at observation time $T_1$. After the image is divided into blocks, a similar block $M_1(\Omega_{i,j,k})$ is searched for around a full-band block of $M_1(i, j)$ at a previous time point to represent a target block $M_2(i, j)$, so as to obtain a weight coefficient. The learned weight coefficient is shared with an upsampled hyperspectral image $\hat{H}_1$ observed at the $T_1$ (observation time) to generate an upsampled hyperspectral image $\hat{H}^*_2$ at the prediction time. This fully utilizes a local self-similarity in a remote-sensing image to learn a time variation feature.

4. The present disclosure establishes a time variation image model. An initialized time variation image generated by $\hat{H}^*_2$ and $\hat{H}_1$ includes a time variation characteristic of a target image between two time points, providing accurate time variation information and hyperspectral resolution information for subsequent estimation of the target image.

5. The present disclosure depicts the time variation based on a generalized linear mixed model, and then coupled with the resolution enhancement reconstruction model for the time variation image to propose a spatial-temporal-spectral fusion model. The estimation of the target image is transformed into estimation of an abundance matrix $A_2$, a time variation matrix P and a time variation image T of the target image. The time variation matrix P in the generalized linear mixed model can capture the time variation of the target image, and the estimation of the time variation image T can serve as a constraint for obtaining the time variation.

6. The present disclosure introduces a spatial smoothing prior for abundance of the target image, a spectral smoothing prior for the time variation, and a low-rank prior for the time variation image model. The introduction of prior information enables the model to obtain an accurate solution, achieving a high-fidelity fused image X.

DETAILED DESCRIPTION OF THE EMBODIMENTS

Figure 1:
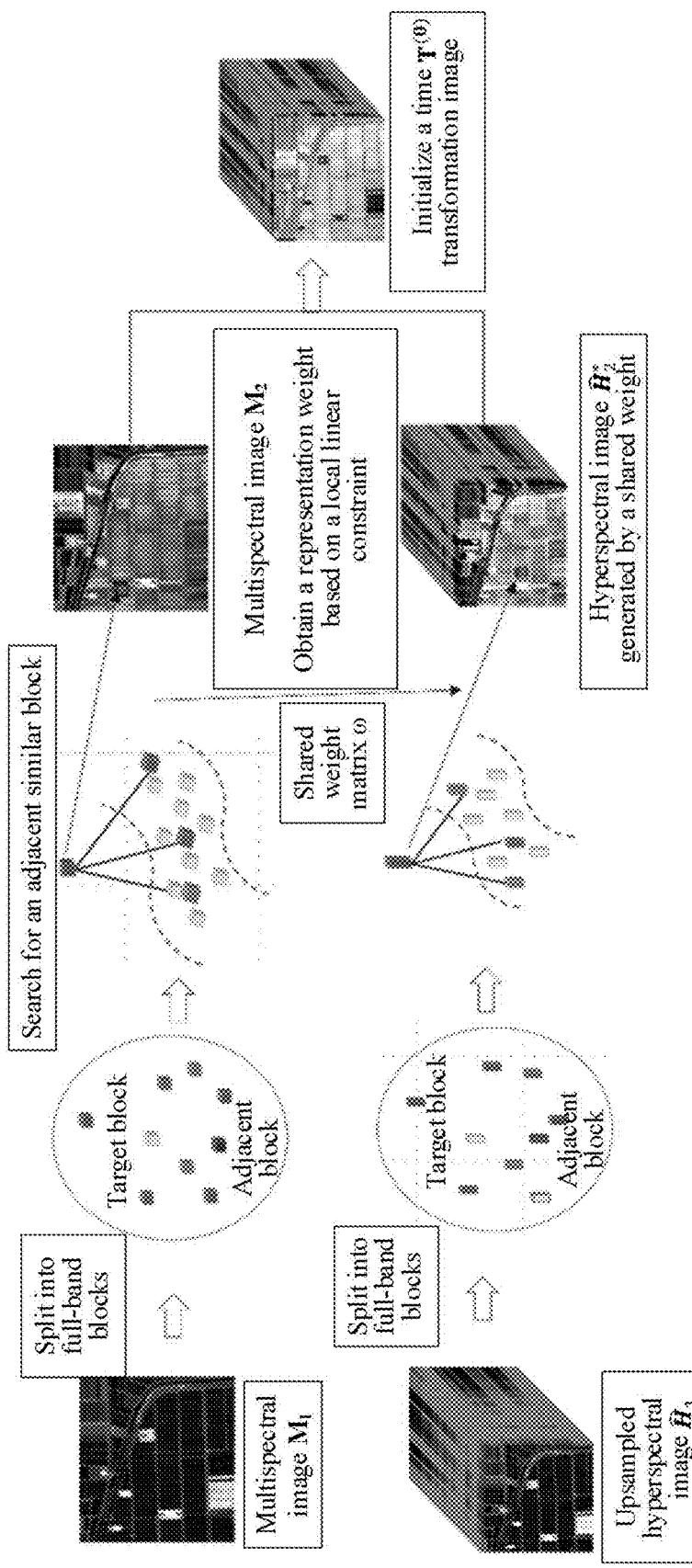
FIG. 1 is a schematic diagram of generating an initialized time variation image based on a local linear constraint according to the present disclosure.
Figure 2:
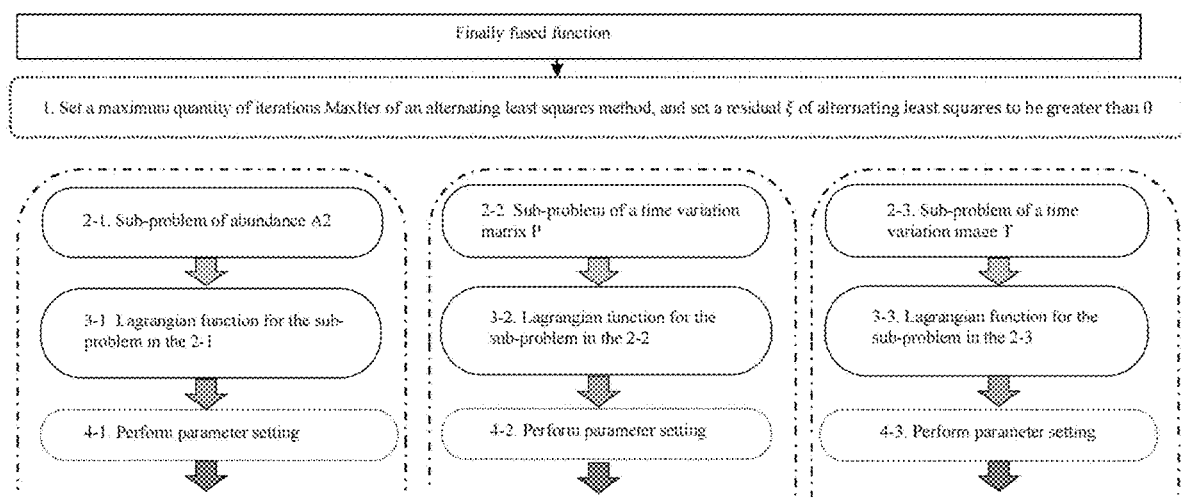
FIG. 2 is a schematic diagram of a spatial-temporal-spectral integrated fusion model according to the present disclosure.

The present disclosure will be further described below with reference to embodiments. The following description of the embodiments is only for helping to understand the present disclosure. It should be noted that, several improvements and modifications may be made by a person of ordinary skill in the art without departing from the principle of the present disclosure, and these improvements and modifications should also fall within the protection scope of the present disclosure.

Embodiment 1

A spatial-temporal-spectral fusion problem addressed by the present disclosure is to predict target image $X_2 \in \mathbb{R}^{L \times W}$ with high spatial, temporal and spectral resolutions at prediction time $T_2$ based on multispectral image $M_1 \in \mathbb{R}^{l \times W}$ (with l bands and W pixels) and hyperspectral image $H_1 \in \mathbb{R}^{L \times w}$ (with L bands and w pixels) that are observed at observation time $T_1$, and multispectral image $M_2 \in \mathbb{R}^{l \times W}$ observed at the T2, where l<L, and w<W. A method provided in the present disclosure includes the following steps:

Step 1: Hyperspectral image $H_1$ and multispectral image $M_1$ at time point $T_1$, and multispectral image $M_2$ at time point $T_2$ are obtained and preprocessed to obtain upsampled hyperspectral image $\hat{H}_1$.

The step 1 includes the following sub-steps:

Step 1.1: The hyperspectral image $H_1 \in \mathbb{R}^{L \times w}$ and the multispectral image $M_1 \in \mathbb{R}^{l \times W}$ at the time point $T_1$, and the multispectral image $M_2 \in \mathbb{R}^{l \times W}$ at the time point $T_2$ are obtained, where l and L represent quantities of bands, w and W represent quantities of pixels, l<L, and w<W.

Step 1.2: The hyperspectral image $H_1$ and the multispectral images $M_1$ and $M_2$ are normalized, and normalized hyperspectral image $H_1$ is upsampled to a spatial size of the multispectral image to obtain the $\hat{H}_1 \in \mathbb{R}^{L \times W}$, where an upsampling method for the hyperspectral image $H_1$ may be bilinear interpolation.

Step 1.3: The multispectral images $M_1$ and $M_2$ and the upsampled hyperspectral image $\hat{H}_1$ are folded into a three-dimensional form along a spectral dimension, and the three-dimensional form is split into $\sqrt{c} \times \sqrt{c} \times 1$ full-band blocks.

Step 2: Based on a local linear constraint, adjacent similar full-band block $M_1(\Omega_{i,j,k})$ in the multispectral image $M_1$ is searched for to represent an image block centered at (i, j) in the multispectral image $M_2$, and a representation weight function of the similar full-band block is obtained; and the representation weight function is shared with the upsampled hyperspectral image $\hat{H}_1$ to obtain upsampled hyperspectral image $\hat{H}^*_2 \in \mathbb{R}^{L \times W}$ at a prediction time point.

In the step 2, the image block centered at the (i, j) in the multispectral image $M_2$ is represented using the adjacent similar full-band block $M_1(\Omega_{i,j,k})$ in the multispectral image $M_1$:

$$M_2(i, j) = \sum_{\Omega_{i,j,k} \in \Omega_{i,j}} \omega_{i,j,k} M_1(\Omega_{i,j,k}),$$

where $\omega_{i,j,k}$ represents a weight of a $k^{th}$ image block in the $\Omega_{i,j,k}$, and the $\omega_{i,j,k}$ is obtained based on the local linear constraint:

$$\min \|M_2(i,j) - M_1(\Omega_{i,j})\omega_{i,j}\|^2 + \lambda \|d_{i,j} e \omega_{i,j}\|^2$$

s.t. $1^T \omega_{i,j} = 1$ where $\omega_{i,j}$ represents a weight corresponding to the image block $M_2(i,j)$, $\|d_{i,j} e \omega_{i,j}\|^2$ represents a regularization term of the local linear constraint, $d_{i,j}$ represents a Euclidean distance between a similar pixel and a center of $M_1(i,j)$, and $\lambda$ represents a regularization term parameter; and a solution to an optimization problem of the local linear constraint is as follows:

$$\omega_{i,j} = ((C_{i,j} + \lambda \operatorname{diag}(d_{i,j}))\backslash 1)(1^T(C_{i,j} + \lambda_{diag}(d_{i,j}))\backslash 1)^{-1}$$

where $C_{i,j} = (M_1(\Omega_{i,j}) - M_2(i,j)^T)(M_1(\Omega_{i,j}) - 1M_2(i,j)^T)^T$ represents a covariance matrix of the image block, diag $(d_{i,j})$ represents a diagonal matrix with $d_{i,j}$ being a diagonal element; afterwards, the weight $\omega_{i,j}$ obtained from the multispectral image is shared with the upsampled hyperspectral image $\hat{H}_1$ to generate the upsampled hyperspectral image $$\hat{H}^*_2 = \sum_{\Omega_{i,j,k} \in \Omega_{i,j}} \omega_{i,j,k} \hat{H}_1(\Omega_{i,j,k})$$

at the prediction time point.

Step 3: A time variation image represented as $T = \hat{H}^*_2 - \hat{H}_1$ is obtained for an initialized target fused image.

Step 4: Target image $X_2$ at the time point $T_2$ is decomposed into endmember matrix $E_2$ with retained spectral information and abundance matrix $A_2$ with retained spatial information of the target image based on a spectral linear mixed model, where $X_2 = E_2 A_2$, and the target image $X_2$ is an image with high spatial, temporal and spectral resolutions.

Step 5: Observation models of the multispectral image, the hyperspectral image, and the image with high spatial, temporal and spectral resolutions are established.

In the step 5, the observation models of the multispectral image, the hyperspectral image, and the image with high spatial, temporal and spectral resolutions are represented as follows:

$$M_i = RX_i = RE_i A_i$$

$$H_i = X_i FS = E_i A_i FS$$

where $i \in \{1,2\}$; $X_i \in \mathbb{R}^{L \times W}$, $H_i \in \mathbb{R}^{L \times w}$, and $M_i \in \mathbb{R}^{l \times W}$ respectively represent an image with high spatial, temporal and spectral resolutions, a hyperspectral image, and a multispectral image at a time point $T_i$; $E_i \in \mathbb{R}^{L \times Q}$ and $A_i \in \mathbb{R}^{Q \times W}$ respectively represent an endmember matrix and an abundance matrix of the image with high spatial, temporal and spectral resolutions at the time point $T^i$, Q represents a quantity of endmembers, and $Q \ll L$; and $R \in \mathbb{R}^{l \times L}$ represents a spectral downsampling matrix, and $F \in \mathbb{R}^{W \times W}$ and $S \in \mathbb{R}^{W \times w}$ respectively represent a spatial blur matrix and a spatial downsampling matrix.

Step 6: A generalized linear mixed model is introduced, and the endmember matrix $E_2$ is represented as $E_2 = P e E_1$, where the symbol e represents a Hadamard product of element-by-element multiplication, P represents a time variation matrix of the target image, and $E_1$ represents an endmember matrix at the time point $T_1$.

In the step 6, after the generalized linear mixed model is introduced, an estimation problem of the target image $X_2$ is transformed into estimation of the abundance matrix $A_2$ of the target image and the time variation matrix P of the target image.

Step 7: The abundance matrix $A_2$, the time variation matrix P, and time variation image T of the target image are obtained.

In the step 7, initialized T is obtained based on $T^{(0)} = \hat{H}^*_2 - \hat{H}_1$. Initialized $E_1$ is extracted from the hyperspectral image $H_1$ by using an endmember extraction algorithm. The time variation matrix P is initialized as $P^{(0)} = 1_L 1_Q^T$. Initialized abundance $A_2$ of the target image is obtained by classifying the multispectral image $M_2$ or by spectral unmixing.

The step 7 includes the following sub-steps:

Step 7.1: A regularization term of the abundance matrix $A_2$, a regularization term of the time variation matrix P and a regularization term of the time variation image T of the target image are separately introduced to obtain an energy function for a fusion problem.

In the step 7.1, the energy function is represented as follows:

$$\arg \min_{A_2, P, T} \frac{1}{2} \|M_2 - R(Pe \ E_1) A_2\|_2^2 +$$

$$\frac{1}{2} \|D - R((Pe \ E_1) A_2 - E_1 A_1)\|_2^2 + \frac{1}{2} \|RT - D\|_2^2 +$$

$$\frac{1}{2} \|T - ((Pe \ E_1) A_2 - E_1 A_1)\|_2^2 + \phi(A_2) + \Psi(P) + Y(T) \text{ s.t. } D = M_2 - M_1$$

The step 7.1 includes the following sub-steps:

Step 7.1.1: The regularization term of the abundance matrix $A_2$ of the target image is introduced, where the regularization term is a spatial smoothing constraint and represented as follows:

$$\phi(A_2) = \frac{\lambda_A}{2}\left(\|H_h A_2\|_{2,1} + \|H_v A_2\|_{2,1}\right)$$

where $H_h$ and $H_v$ represent linear operators respectively used to calculate horizontal and vertical gradients between components of adjacent pixels in a two-dimensional signal, $\|\cdot\|_{2,1}$ represents a mixed $L_{2,1}$ norm, and $\lambda_A$ represents a regularization parameter of the abundance matrix $A_2$.

Step 7.1.2: The regularization term of the time variation matrix P is introduced, where the regularization term is a spectral smoothing constraint and represented as follows:

$$\Psi(P) = \frac{\lambda_1}{2} \|H_\ell P\|_F^2 + \frac{\lambda_2}{2} \|P - 1_L 1_Q^T\|_F^2$$

where $H_1$ represents a differential operator in a spectral dimension direction, and $\lambda_1$ and $\lambda_2$ represent regularization parameters of the time variation matrix P.

Step 7.1.3: The regularization term of the time variation image T is introduced, where the regularization term is a low-rank constraint and represented as follows: $\mathcal{T}$ $$Y(T) = \lambda_T \|\mathcal{T}\|_{TNN}$$

where $\mathcal{T}$ represents a third-order tensor form of the T; $\|\cdot\|_{TNN}$ represents a tensor nuclear norm, with $$\|\mathcal{T}\|_{TNN} = \sum_{i=1}^{3} \sum_{j} \sigma_j(\overline{T}^{(i)}),$$

where $\sigma_j(\overline{T}^{(i)})$ represents $j^{th}$ singular value of $\overline{T}^{(i)}$, and $\overline{T}$ is obtained by performing Fourier transform on the T; and $\lambda_T$ represents a regularization parameter of the time variation image T.

In the step 7.1, the present disclosure couples a generalized spectral linear mixed model and a time variation image reconstruction model, and introduces the abundance matrix $A_2$, the time variation matrix P of the target image, and a prior term of reconstructed time variation image T to construct a spatial-temporal-spectral fusion model.

Step 7.2: The energy function is split into three sub-functions corresponding to variables of the abundance matrix $A_2$, the time variation matrix P and the time variation image T, a plurality of auxiliary variables are introduced for each sub-function to split the sub-function into sub-problems, and an augmented Lagrangian function is constructed for each sub-problem.

In the step 7.2, a splitting strategy used in the present disclosure is to separately solve one of the variables while fixing the other two variables, and use an alternating least squares method to minimize a loss function corresponding to each variable, in order to obtain a local stationary point.

In the step 7.2, a sub-problem of the abundance matrix $A_2$ of the target image is as follows:

$$A_2 = \arg\min_{A_2} \frac{1}{2}\|M_2 - R(Pe\ E_1)A_2\|_2^2 + \frac{1}{2}\|D - R((Pe\ E_1)A_2 - E_1A_1)\|_2^2 +$$
$$\frac{\eta}{2}\|T - ((Pe\ E_1)A_2 - E_1A_1)\|_2^2 + \frac{\lambda_A}{2}(\|H_hA_2\|_{2,1} + \|H_vA_2\|_{2,1})$$

auxiliary variables $B_1 = A_2$, $B_2 = H_h(A_1)$, and $B_3 = H_v(A_1)$ are introduced, $u = vec(A_2)$ is set, symbol $vec(\cdot)$ represents a vectorization operation, and an augmented Lagrangian function for the sub-problem of the abundance matrix $A_2$ is given as follows:

$$\mathcal{L}(u, B_1, B_2, B_3, V_1, V_2, V_3) = \frac{1}{2}\|vec(M_2) - rep_M(R(Pe\ E_1)u)\|_2^2 +$$
$$\frac{1}{2}\|vec(D) - rep_M(R((Pe\ E_1)u - )) + vec(E_1A_1)\|_2^2 +$$
$$\frac{\eta}{2}\|vec(T) - rep_M((Pe\ E_1)u) + vec(E_1A_1)\|_2^2 +$$
$$\lambda_A(\|B_2\|^2 + \|B_3\|^2) + \frac{\rho}{2}(\|vec(B_1) - u + V_1\|_2^2 +$$
$$\|vec(B_2) - H_hvec(B_1) + V_2\|_2^2 + \|vec(B_3) - H_vvec(B_1) + V_3\|_2^2)$$

where matrix $V_i$, $i=1,2,3$ represents a dual variable of a Lagrangian function; $\rho$ represents a step size, where $\rho>0$; and $rep_M(V)$ represents a block diagonal matrix of matrix V and means copying the matrix V along a diagonal for M times.

The present disclosure splits a solution of a Lagrangian function of the abundance matrix $A_2$ into sub-problems about variables u, $B_1$, $B_2$, $B_3$, $V_1$, $V_2$, $V_3$.

The sub-problem of the variable u of the abundance matrix $A_2$ is as follows:

$$u \in \arg\min_{u} \mathcal{L}(u, B_1, B_2, B_3, V_1, V_2, V_3) =$$
$$\arg\min_{u} \frac{1}{2}\|vec(M_2) - rep_M(R(PeE_1)u)\|_2^2 +$$
$$\frac{1}{2}\|vec(D) - rep_M(R((PeE_1)u)) + vec(E_1A_1)\|_2^2 +$$
$$\frac{\eta}{2}\|vec(T) - rep_M((PeE_1)u) + vec(E_1A_1)\|_2^2 + \frac{\rho}{2}\|vec(B_1) - u + V_1\|_2^2$$

A solution to the above equation is: $u^* = \Omega_1^{-1}\Omega_2$, where $\Omega_1$ and $\Omega_2$ are given according to the following equations:

$$\Omega_1 = 2(R(PeE_1))^T R(PeE_1) + \eta(PeE_1)^T(PeE_1) + \rho I$$

$$\Omega_2 = (R(PeE_1))^T(M_2 + D + H_1) + (PeE_1)^T(T + E_1A_1) + \rho(B_1 + V_1)$$

The sub-problem of the variable $B_1$ of the abundance matrix $A_2$ is as follows:

$$B_1 \in \arg\min_{B_1} \mathcal{L}(u, B_1, B_2, B_3, V_1, V_2, V_3) =$$
$$\arg\min_{B_1} \frac{\rho}{2}(\|vec(B_1) - u + V_1\|_2^2 +$$
$$\|vec(B_2) - H_hvec(B_1) + V_2\|_2^2 + \|vec(B_3) - H_vvec(B_1) + V_3\|_2^2)$$

A solution to the above equation is:

$$vec(B_1) = (1 + H_h^T H_h + H_v^T H_v)^{-1}(u - V_1 + H_h^T vec(B_2) + H_v^T V_2 + H_v^T vec(B_3) + H_v^T V_3)$$

The symbol $vec(\cdot)$ in the above equation represents an operator that converts a matrix into a vector.

The sub-problem of the variable $B_2$ of the abundance matrix $A_2$ is as follows:

$$B_2 \in \arg\min_{B_2} \mathcal{L}(u, B_1, B_2, B_3, V_1, V_2, V_3) =$$
$$\arg\min_{B_2} \frac{\lambda_A}{2}\|H_hA_2\|_{2,1} + \|vec(B_2) - H_hvec(B_1) + V_2\|_2^2$$

A solution to the above equation is equivalent to a proximal operator of an $L_2$ norm. This solution can be obtained by using a soft-threshold operator, which is expressed as follows:

$$B_2^* = soft_{\lambda_A/\rho}(H_hvec(B_1) + V_2)$$

In the above equation, the soft-threshold operator is defined as follows:

$$soft_a(b) = \begin{cases} \max\left(1 - \frac{a}{\|b\|}, 0\right)b, & b \neq 0 \\ 0, & b = 0 \end{cases}$$

The sub-problem of the variable $B_3$ of the abundance matrix $A_2$ is as follows:

$$B_3 \in \underset{B_3}{\operatorname{argmin}} \, \mathcal{L}(u, B_1, B_2, B_3, V_1, V_2, V_3) =$$

$$\underset{B_3}{\operatorname{argmin}} \frac{\lambda_A}{2} \|H_h A_2\|_{2,1} + \|vec(B_2) - H_h vec(B_1) + V_2\|_2^2$$

Similar to an optimization strategy of the sub-problem of the $B_2$, a solution is obtained by a soft threshold:

$$B_3^* = soft_{\lambda_A/\rho}(H_v vec(B_1) + V_3)$$

An update rule for the dual variable of the variable of the abundance matrix $A_2$ is as follows:

$$V_1 \leftarrow V_1 + vec(B_1) - u$$

$$V_2 \leftarrow V_2 + vec(B_2) - H_h vec(B_1)$$

$$V_3 \leftarrow V_3 + vec(B_3) - H_v vec(B_1)$$

A sub-problem of the time variation matrix P of the target image is as follows:

$$P = \underset{P}{\operatorname{argmin}} \frac{1}{2} \|M_2 - R(Pe\ E_1) A_2\|_2^2 + \frac{1}{2} \|D - R((Pe\ E_1) A_2 - E_1 A_1)\|_2^2 +$$

$$\frac{1}{2} \|T - ((Pe\ E_1) A_2 - E_1 A_1)\|_2^2 + \frac{\lambda_1}{2} \|P - 1_L 1_Q\|_2^2 + \frac{\lambda_2}{2} \|H_l P\|_2^2$$

Auxiliary variable $B = PeE_1$ is introduced, and an augmented Lagrangian function for the sub-problem of the time variation matrix P is as follows:

$$\mathcal{L}(B, P, V) =$$

$$\frac{1}{2} \|M_2 - RBA_2\|_2^2 + \frac{1}{2} \|D - R(BA_2 - E_1 A_1)\|_2^2 + \frac{\eta}{2} \|T - (BA_2 - E_1 A_1)\|_2^2 +$$

$$\frac{\lambda_1}{2} \|P - 1_L 1_Q\|_2^2 + \frac{\lambda_2}{2} \|H_l P\|_2^2 + \frac{\rho}{2} \left( \|B - PeE_1 + V\|_2^2 \right)$$

The present disclosure splits a solution of the augmented Lagrangian function of the time transformation P into sub-problems about variables B, P, V.

The sub-problem of the variable B of the time transformation P is as follows:

$$B \in \underset{B}{\operatorname{argmin}} \, \mathcal{L}(B, P, V) = \underset{B}{\operatorname{argmin}} \frac{1}{2} \|M_2 - RBA_2\|_2^2 +$$

$$\frac{1}{2} \|D - R(BA_2 - Y_1)\|_2^2 + \frac{1}{2} \|T - (BA_2 - Y_1)\|_2^2 + \frac{\rho}{2} \left( \|B - PeE_1 + V\|_2^2 \right)$$

A solution to the above equation is:

$$(2R^T R + 1) B A_2 A_2^T + \rho B = R^T (M_2 + D + R E_1 A_1) A_2^T + (T + E_1 A_1) A_2^T + \rho (PeE_1 - V)$$

The above equation forms a Silvestre equation, which can be solved using command X=dlyap(A,B,C) in matlab.

The sub-problem of the variable P of the time transformation P is as follows:

$$P \in \underset{P}{\operatorname{argmin}} \, \mathcal{L}(B, P, V) =$$

$$\underset{P}{\operatorname{argmin}} \frac{\lambda_1}{2} \|P - 1_L 1_Q\|_2^2 + \frac{\lambda_2}{2} \|H_l P\|_2^2 + \frac{\rho}{2} \left( \|B - Pe\ E_1 + V\|_2^2 \right)$$

The above equation is rewritten into a form of a vector for solving:

$$P^* = invec(\lambda_1 1 + \rho vec((E_1 e\ B + E_1 e\ V))/(\lambda_1 I + \lambda_2 \, rep_Q$$
$$(H_L^T H_L) + \rho \, diag(vec(E_1 e E1))))$$

An update rule for a dual variable of the time transformation P is as follows:

$$V \leftarrow V + B - PeE_1$$

A sub-problem of the time variation image T of the target image is as follows:

$$T = \arg\underset{T}{\min} \frac{1}{2} \|RT - D\|_2^2 + \frac{1}{2} \|T - ((PeE_1) A_2 - E_1 A_1)\|_2^2 + \lambda_T \|\mathcal{T}\|_{TNN}$$

Auxiliary variable $\mathcal{B} = \mathcal{T}$ is introduced, and an augmented Lagrangian function for the sub-problem of the time variation image T is as follows:

$$T = \arg\underset{T}{\min} \frac{1}{2} \|RT - D\|_2^2 + \frac{1}{2} \|T - ((PeE_1) A_2 - E_1 A_1)\|_2^2 + \lambda_T \|\mathcal{B}\|_{TNN}$$

The present disclosure splits a solution of a Lagrangian function of the time variation image T into sub-problems about variables $\mathcal{T}$, $\mathcal{B}$, $\mathcal{V}$, where the $\mathcal{T}$, $\mathcal{B}$, $\mathcal{V}$ respectively represent third-order tensor forms of matrices T, B, V.

The sub-problem of the variable $\mathcal{T}$ of the time variation image T is as follows:

$$\mathcal{T} \in \arg\underset{\mathcal{B}}{\min} \, \mathcal{L}(\mathcal{T}, \mathcal{B}, \mathcal{V}) =$$

$$\arg\underset{\mathcal{T}}{\min} \frac{1}{2} \|RT - D\|_2^2 + \frac{1}{2} \|T - ((PeE_1) A_2 - E_1 A_1)\|_2^2 + \frac{\rho}{2} \left( \|\mathcal{B} - \mathcal{T} + \mathcal{V}\|_2^2 \right)$$

The $\mathcal{T}$, $\mathcal{B}$, $\mathcal{V}$ are expanded into matrices, and $\partial \mathcal{L}L/\partial T$ is set to be equal to 0 to obtain an equation for solving the T:

$$T^* = \left( \frac{1}{1+\rho} R^T RT + 1 \right)^{-1} \left( \frac{1}{1+\rho} (R^T D + \eta((PeE_1) A_2 - E_1 A_1) + \rho(B + V)) \right)$$

The sub-problem of the variable $\mathcal{B}$ of the time variation image T is as follows:

$$\mathcal{B} \in \arg\underset{\mathcal{B}}{\min} \, \mathcal{L}(\mathcal{T}, \mathcal{B}, \mathcal{V}) = \arg\underset{\mathcal{B}}{\min} \frac{\rho}{2} \|\mathcal{B} - \mathcal{T} + \mathcal{V}\|_2^2 + \lambda_T \|\mathcal{B}\|_{TNN}$$

A solution to the above equation is:

$$B^* = \sum_{i=1}^{3} \text{fold}_i\left(S_{\frac{\rho}{\lambda_T},\varepsilon}(B+V)\right), \text{ where } S_{\frac{\rho}{\lambda_T},\varepsilon}(\cdot) = U\left(\sum - \frac{\rho}{\lambda_T}\text{diag}(\varepsilon)\right)V^T$$

represents a singular value contraction operator, and $U\Sigma V^T$ represents a singular value decomposition process.

An update rule for a dual variable of the time transformation $T$ is as follows:

$$\mathcal{V} \leftarrow \mathcal{V} + \mathcal{B} - \mathcal{T}$$

Step 7.3: An alternating direction method of multipliers is used to perform optimal solving on the augmented Lagrangian function to obtain the abundance matrix $A_2$, the time variation matrix $P$ and the time variation image $T$ of the target image.

Step 8: The target image is finally obtained by multiplying the endmember matrix $E_1$ at the time point $T_1$ by the time variation matrix $P$ at the time point $T_2$ element by element and then by the abundance matrix $A_2$ with high resolution: $X=(P e E_1)A_2$.

Embodiment 2

A device for generating a satellite remote-sensing image with high spatial, temporal and spectral resolutions includes:
- a first obtaining module configured to obtain hyperspectral image $H_1$ and multispectral image $M_1$ at time point $T_1$, and multispectral image $M_2$ at time point $T_2$, and perform preprocessing to obtain upsampled hyperspectral image $\hat{H}_1$;
- a search module configured to: based on a local linear constraint, search for adjacent similar full-band block $M_1(\Omega_{i,j,k})$ in the multispectral image $M_1$ to represent an image block centered at (i,j) in the multispectral image $M_2$, and obtain a representation weight function of the similar full-band block; and share the representation weight function with the upsampled hyperspectral image $\hat{H}_1$ to obtain upsampled hyperspectral image $\hat{H}^*_2 \in \mathbb{R}^{L \times W}$ at a prediction time point;
- a second obtaining module configured to obtain a time variation image represented as $T=\hat{H}^*_2-\hat{H}_1$ for an initialized target fused image;
- a decomposition module configured to decompose target image $X_2$ at the time point $T_2$ into endmember matrix $E_2$ and abundance matrix $A_2$ based on a spectral linear mixed model, where $X_2=E_2A_2$, and the target image $X_2$ is an image with high spatial, temporal and spectral resolutions;
- an establishment module configured to establish observation models of the multispectral image, the hyperspectral image, and the image with high spatial, temporal and spectral resolutions;
- a representation module configured to introduce a generalized linear mixed model, and represent the endmember matrix $E_2$ as $E_2=PeE_1$, where the symbol $\odot$ represents a Hadamard product of element-by-element multiplication, $P$ represents a time variation matrix of the target image, and $E_1$ represents an endmember matrix at the time point $T_1$;
- a third obtaining module configured to obtain the abundance matrix $A_2$, the time variation matrix $P$, and time variation image $T$ of the target image; and
- an obtaining module configured to obtain the target image finally by multiplying the endmember matrix $E_1$ at the time point $T_1$ by the time variation matrix $P$ at the time point $T_2$ element by element and then by the abundance matrix $A_2$ with high resolution: $X=(PeE_1)A_2$.

In conclusion, the present disclosure proposes a time variation model for depicting and modeling a time variation characteristic of an image, and a resolution enhancement reconstruction model that is of a time variation image and achieves a fidelity optimization solving of a time variation. The time variation model and the resolution enhancement reconstruction model of the time variation image are coupled to establish a generalized spatial-temporal-spectral fusion framework. The time variation model models and depicts time variation characteristics between images, while the resolution enhancement reconstruction model of the time variation image obtains a fidelity constraint on the time variation. This method can achieve spatial-temporal-spectral fusion of a hyperspectral image with low temporal and spatial resolutions and a multispectral image with high temporal and spatial resolutions to generate a fused image with high spatial and spectral fidelity and high spatial, temporal and spectral resolutions.

The invention claimed is:

1. A method for generating a satellite remote-sensing image with high spatial, temporal and spectral resolutions, comprising:
   step 1: obtaining a hyperspectral image $H_1$ and a multispectral image $M_1$ at a time point $T_1$, and a multispectral image $M_2$ at a time point $T_2$, and performing preprocessing to obtain an upsampled hyperspectral image $\hat{H}_1$;
   step 2: based on a local linear constraint, searching for an adjacent similar full-band block $M_1(\Omega_{i,j,k})$ in the multispectral image $M_1$ to represent an image block centered at (i, j) in the multispectral image $M_2$, and obtaining a representation weight function of the adjacent similar full-band block; and sharing the representation weight function with the upsampled hyperspectral image $\hat{H}_1$ to obtain an upsampled hyperspectral image $\hat{H}^*_2 \in \mathbb{R}^{L \times W}$ at a prediction time point;
   step 3: obtaining a time variation image represented as $T=\hat{H}^*_2-\hat{H}_1$ for an initialized target fused image;
   step 4: decomposing a target image $X_2$ at the time point $T_2$ into an endmember matrix $E_2$ and an abundance matrix $A_2$ based on a spectral linear mixed model, wherein $X_2=E_2A_2$, and the target image $X_2$ is an image with high spatial, temporal and spectral resolutions;
   step 5: establishing observation models of the multispectral image, the hyperspectral image, and the image with high spatial, temporal and spectral resolutions;
   step 6: introducing a generalized linear mixed model, and representing the endmember matrix $E_2$ as $E_2=PeE_1$, wherein a symbol e represents a Hadamard product of element-by-element multiplication, $P$ represents a time variation matrix of the target image, and $E_1$ represents an endmember matrix at the time point $T_1$;
   step 7: obtaining the abundance matrix $A_2$, the time variation matrix $P$ and a time variation image $T$ of the target image; and
   step 8: obtaining the target image finally by multiplying the endmember matrix $E_1$ at the time point $T_1$ by the time variation matrix $P$ at the time point $T_2$ element by element and then by the abundance matrix $A_2$ with high resolution: $X=(P^e E_1)A_2$.

2. The method for generating the satellite remote-sensing image with high spatial, temporal and spectral resolutions according to claim 1, wherein the step 1 comprises:

step 1.1: obtaining the hyperspectral image $H_1 \in \mathbb{R}^{L \times w}$ and the multispectral image $M_1 \in \mathbb{R}^{l \times W}$ at the time point $T_1$, and the multispectral image $M_2 \in \mathbb{R}^{l \times W}$ at the time point $T_2$, wherein l and L represent quantities of bands, w and W represent quantities of pixels, l<L, and w<W;

step 1.2: normalizing the hyperspectral image $H_1$ and the multispectral images $M_1$ and $M_2$, and upsampling a normalized hyperspectral image $\bar{H}_1$ to a spatial size of the multispectral image to obtain the $\hat{H}_1 \in \mathbb{R}^{L \times W}$; and step 1.3: folding the multispectral images $M_1$ and $M_2$ and the upsampled hyperspectral image $\hat{H}_1$ into a three-dimensional form along a spectral dimension, and splitting the three-dimensional form into full-band blocks with both a width and a height being $\sqrt{c}$ and the spectral dimension being 1.

3. The method for generating the satellite remote-sensing image with high spatial, temporal and spectral resolutions according to claim 2, wherein in the step 5, the observation models of the multispectral image, the hyperspectral image, and the image with high spatial, temporal and spectral resolutions are represented as follows:

$$M_i = RX_i = RE_i A_i$$

$$H_i = X_i FS = E_i A_i FS$$

wherein $i \in \{1,2\}$; $X_i \in \mathbb{R}^{L \times W}$, $H_i \in \mathbb{R}^{L \times w}$, and $M_i \in \mathbb{R}^{l \times W}$ respectively represent an image with high spatial, temporal and spectral resolutions, a hyperspectral image, and a multispectral image at a time point $T_i$; $E_i \in \mathbb{R}^{L \times Q}$ and $A_i \in \mathbb{R}^{Q \times W}$ respectively represent an endmember matrix and an abundance matrix of the image with high spatial, temporal and spectral resolutions at the time point $T_i$, and Q represents a quantity of endmembers; and $R \in \mathbb{R}^{l \times L}$ represents a spectral downsampling matrix, and $F \in \mathbb{R}^{W \times W}$ and $S \in \mathbb{R}^{W \times w}$ respectively represent a spatial blur matrix and a spatial downsampling matrix.

4. The method for generating the satellite remote-sensing image with high spatial, temporal and spectral resolutions according to claim 3, wherein the step 7 comprises:

step 7.1: separately introducing a regularization term of the abundance matrix $A_2$, a regularization term of the time variation matrix P and a regularization term of the time variation image T of the target image to obtain an energy function for a fusion problem;

step 7.2: splitting the energy function into three sub-functions corresponding to variables of the abundance matrix $A_2$, the time variation matrix P and the time variation image T, introducing a plurality of auxiliary variables for each sub-function to split the sub-function into sub-problems, and constructing an augmented Lagrangian function for each sub-problem; and step 7.3: using an alternating direction method of multipliers to perform optimal solving on the augmented Lagrangian function to obtain the abundance matrix $A_2$, the time variation matrix P and the time variation image T of the target image.

5. The method for generating the satellite remote-sensing image with high spatial, temporal and spectral resolutions according to claim 4, wherein in the step 7.1, the energy function is represented as follows:

$$\arg\min_{A_2,P,T} \frac{1}{2}\|M_2 - R(PeE_1)A_2\|_2^2 + \frac{1}{2}\|D - R((PeE_1)A_2 - E_1A_1)\|_2^2 +$$

-continued $$\frac{1}{2}\|RT - D\|_2^2 + \frac{1}{2}\|T - ((PeE_1)A_2 - E_1A_1)\|_2^2 + \Phi(A_2) + \Psi(P) + \Upsilon(T)$$

s.t. $D = M_2 - M_1$ wherein D represents a differential image of the multispectral images $M_2$ and $M_1$.

6. The method for generating the satellite remote-sensing image with high spatial, temporal and spectral resolutions according to claim 5, wherein the step 7.1 comprises:

step 7.1.1: introducing the regularization term of the abundance matrix $A_2$ of the target image, wherein the regularization term of the abundance matrix $A_2$ of the target image is a spatial smoothing constraint and represented as follows:

$$\Phi(A_2) = \frac{\lambda_A}{2}\left(\|H_h A_2\|_{2,1} + \|H_v A_2\|_{2,1}\right)$$

wherein $H_h$ and $H_v$ represent linear operators respectively used to calculate horizontal and vertical gradients between components of adjacent pixels in a two-dimensional signal, $\|\cdot\|_{2,1}$ represents a mixed $L_{2,1}$ norm, and $\lambda_A$ represents a regularization parameter of the abundance matrix $A_2$;

step 7.1.2: introducing the regularization term of the time variation matrix P, wherein the regularization term of the time variation matrix P is a spectral smoothing constraint and represented as follows:

$$\Psi(P) = \frac{\lambda_1}{2}\|H_\ell P\|_F^2 + \frac{\lambda_2}{2}\|P - 1_L 1_Q^T\|_F^2$$

wherein $H_1$ represents a differential operator in a spectral dimension direction, $1_L 1_Q^T \in \mathbb{R}^{L \times Q}$ represents a matrix with all elements in L rows and Q columns being 1, and $\lambda_1$ and $\lambda_2$ represent regularization parameters of the time variation matrix P; and step 7.1.3: introducing the regularization term of the time variation image T, wherein the regularization term of the time variation image T is a low-rank constraint and represented as follows:

$$\Upsilon(T) = \lambda_T \|\mathcal{T}\|_{TNN}$$

wherein $\mathcal{T}$ represents a third-order tensor form of the T; $\|\cdot\|_{TNN}$ represents a tensor nuclear norm, with $$\|\mathcal{T}\|_{TNN} = \sum_{i=1}^{3} \sum_j \sigma_j(\overline{T}^{(i)}),$$

wherein $\sigma_j(\overline{T}^{(i)})$ represents a $j^{th}$ singular value of $\overline{T}^{(i)}$, and $\overline{T}$ is obtained by performing Fourier transform on the T; and $\lambda_T$ represents a regularization parameter of the time variation image T.

7. The method for generating the satellite remote-sensing image with high spatial, temporal and spectral resolutions according to claim 6, wherein in the step 7.2, a sub-problem of the abundance matrix $A_2$ of the target image is as follows:

$$A_2 = \arg\min_{A_2} \frac{1}{2}\|M_2 - R(PeE_1)A_2\|_2^2 + \frac{1}{2}\|D - R((PeE_1)A_2 - E_1A_1)\|_2^2 +$$

-continued $$\frac{\eta}{2}\|T-((PeE_1)A_2-E_1A_1)\|_2^2+\frac{\lambda_A}{2}(\|H_hA_2\|_{2,1}+\|H_vA_2\|_{2,1})$$

wherein η represents a term parameter of the time variation image and is used to control a contribution of the time variation image to a model; and auxiliary variables $B_1=A_2$, $B_2=H_h(A_1)$, and $B_3=H_v(A_1)$ are introduced, $u=vec(A_2)$ is set, a symbol vec(·) represents a vectorization operation, and an augmented Lagrangian function for the sub-problem of the abundance matrix $A_2$ is given as follows:

$$\mathcal{L}(u, B_1, B_2, B_3, V_1, V_2, V_3)$$

$$=\frac{1}{2}\|vec(M_2)-rep_M(R(PeE_1)u)\|_2^2$$

$$+\frac{1}{2}\|vec(D)-rep_M(R((PeE_1)u-))+vec(E_1A_1)\|_2^2$$

$$+\frac{\eta}{2}\|vec(T)-rep_M((PeE_1)u)+vec(E_1A_1)\|_2^2$$

$$+\lambda_A(\|B_2\|^2+\|B_3\|^2)+\frac{\rho}{2}(\|vec(B_1)-u+V_1\|_2^2$$

$$+\|vec(B_2)-H_hvec(B_1)+V_2\|_2^2$$

$$+\|vec(B_3)-H_vvec(B_1)+V_3\|_2^2)$$

wherein a matrix $V_i$, i=1,2,3 represents a dual variable of a Lagrangian function; ρ represents a step size, wherein ρ>0; and $rep_M(V)$ represents a block diagonal matrix of a matrix V and means copying the matrix V along a diagonal for M times.

8. The method for generating the satellite remote-sensing image with high spatial, temporal and spectral resolutions according to claim 7, wherein in the step 7.2, a sub-problem of the time variation matrix P of the target image is as follows:

$$P=\arg\min_P \frac{1}{2}\|M_2-R(PeE_1)A_2\|_2^2+\frac{1}{2}\|D-R((PeE_1)A_2-E_1A_1)\|_2^2+$$

$$\frac{1}{2}\|T-((PeE_1)A_2-E_1A_1)\|_2^2+\frac{\lambda_1}{2}\|P-1_L1_Q\|_2^2+\frac{\lambda_2}{2}\|H_lP\|_2^2$$

an auxiliary variable $B=PeE_1$ is introduced, and an augmented Lagrangian function for the sub-problem of the time variation matrix P is as follows:

$$\mathcal{L}(B,P,V)=\frac{1}{2}\|M_2-RBA_2\|_2^2+\frac{1}{2}\|D-R(BA_2-E_1A_1)\|_2^2$$

$$+\frac{\eta}{2}\|T-(BA_2-E_1A_1)\|_2^2$$

$$+\frac{\lambda_1}{2}\|P-1_L1_Q\|_2^2+\frac{\lambda_2}{2}\|H_lP\|_2^2$$

$$+\frac{\rho}{2}(\|B-PeE_1+V\|_2^2)$$

a sub-problem of the time variation image T of the target image is as follows:

$$T=\arg\min_T \frac{1}{2}\|RT-D\|_2^2+\frac{1}{2}\|T-((PeE_1)A_2-E_1A_1)\|_2^2+\lambda_T\|\mathcal{T}\|_{TNN}$$

an auxiliary variable $\mathcal{B}=\mathcal{T}$ is introduced and an augmented Lagrangian function for the $\mathcal{B}$ sub-problem of the time variation image T is as follows:

$$T=\arg\min_T \frac{1}{2}\|RT-D\|_2^2+\frac{1}{2}\|T-((PeE_1)A_2-E_1A_1)\|_2^2+\lambda_T\|\mathcal{B}\|_{TNN}.$$

9. The method for generating the satellite remote-sensing image with high spatial, temporal and spectral resolutions according to claim 8, wherein in the step 2, the image block centered at the (i, j) in the multispectral image $M_2$ is represented using the adjacent similar full-band block $M_1(\Omega_{i,j,k})$ in the multispectral image $M_1$:

$$M_2(i,j)=\sum_{\Omega_{i,j,k}\in\Omega_{i,j}}\omega_{i,j,k}M_1(\Omega_{i,j,k}),$$

wherein $\omega_{i,j,k}$ represents a weight of a $k^{th}$ image block in the $\Omega_{i,j,k}$, and the $\omega_{i,j,k}$ is obtained based on the local linear constraint:

$$\min\|M_2(i,j)-M_1(\Omega_{i,j})\omega_{i,j}\|^2+\lambda\|d_{i,j}e\omega_{i,j}\|^2$$

$$\text{s.t. } 1^T\omega_{i,j}=1$$

wherein $\omega_{i,j}$ represents a weight corresponding to the image block $M_2(i,j)$, $\|d_{i,j}e\omega_{i,j}\|^2$ represents a regularization term of the local linear constraint, $d_{i,j}$ represents a Euclidean distance between a similar pixel and a center of $M_1(i,j)$, and λ represents a regularization term parameter; and a solution to an optimization problem of the local linear constraint is as follows:

$$\omega_{i,j}=((C_{i,j}+\lambda\text{diag}(d_{i,j}))\backslash 1)(1^T(C_{i,j}+\lambda\text{diag}(d_{i,j}))\backslash 1)^{-1}$$

wherein $C_{i,j}=(M_1(\Omega_{i,j})-M_2(i,j)^T)(M_1(\Omega_{i,j})-1M_2(i,j)^T)^T$ represents a covariance matrix of the image block, $\text{diag}(d_{i,j})$ represents a diagonal matrix with $d_{i,j}$ being a diagonal element; afterwards, the weight $\omega_{i,j}$ obtained from the multispectral image is shared with the upsampled hyperspectral image $\hat{H}_1$ to generate the upsampled hyperspectral image $$\hat{H}_2^*=\sum_{\Omega_{i,j,k}\in\Omega_{i,j}}\omega_{i,j,k}\hat{H}_1(\Omega_{i,j,k}),$$

at the prediction time point.

10. A device for generating a satellite remote-sensing image with high spatial, temporal and spectral resolutions, configured to execute the method for generating the satellite remote-sensing image with high spatial, temporal and spectral resolutions according to claim 1, and comprising:
a first obtaining module configured to obtain the hyperspectral image $H_1$ and the multispectral image $M_1$ at the time point $T_1$, and the multispectral image $M_2$ at the time point $T_2$, and perform preprocessing to obtain the upsampled hyperspectral image $\hat{H}_1$;
a search module configured to: based on the local linear constraint, search for the adjacent similar full-band block $M_1(\Omega_{i,j,k})$ in the multispectral image $M_1$ to represent the image block centered at (i, j) in the multispectral image $M_2$, and obtain the representation weight function of the adjacent similar full-band block; and share the representation weight function with the upsampled hyperspectral image $\hat{H}_1$ to obtain the upsampled hyperspectral image $\hat{H}^*_2 \in \mathbb{R}^{L\times W}$ at the prediction time point;

a second obtaining module configured to obtain the time variation image represented as $T=\hat{H}*_2-\hat{H}_1$ for the initialized target fused image;

a decomposition module configured to decompose the target image $X_2$ at the time point $T_2$ into the endmember matrix $E_2$ and the abundance matrix $A_2$ based on the spectral linear mixed model, wherein $X_2=E_2A_2$, and the target image $X_2$ is the image with high spatial, temporal and spectral resolutions;

an establishment module configured to establish the observation models of the multispectral image, the hyperspectral image, and the image with high spatial, temporal and spectral resolutions;

a representation module configured to introduce the generalized linear mixed model, and represent the endmember matrix $E_2$ as $E_2=PeE_1$, wherein the symbol e represents the Hadamard product of element-by-element multiplication, P represents the time variation matrix of the target image, and $E_1$ represents the endmember matrix at the time point $T_1$;

a third obtaining module configured to obtain the abundance matrix $A_2$, the time variation matrix P and the time variation image T of the target image; and an obtaining module configured to obtain the target image finally by multiplying the endmember matrix $E_1$ at the time point $T_1$ by the time variation matrix P at the time point $T_2$ element by element and then by the abundance matrix $A_2$ with high resolution: $X=(P^eE_1)A_2$.

11. The device for generating the satellite remote-sensing image with high spatial, temporal and spectral resolutions according to claim 10, wherein the step 1 of the method for generating the satellite remote-sensing image with high spatial, temporal and spectral resolutions comprises:

step 1.1: obtaining the hyperspectral image $H_1 \in \mathbb{R}^{L \times w}$ and the multispectral image $M_1 \in \mathbb{R}^{l \times W}$ at the time point $T_1$, and the multispectral image $M_2 \in \mathbb{R}^{l \times W}$ at the time point $T_2$, wherein l and L represent quantities of bands, w and W represent quantities of pixels, l<L, and w<W;

step 1.2: normalizing the hyperspectral image $H_1$ and the multispectral images $M_1$ and $M_2$, and upsampling a normalized hyperspectral image $\hat{H}_1$ to a spatial size of the multispectral image to obtain the $\hat{H}_1 \in \mathbb{R}^{L \times W}$; and step 1.3: folding the multispectral images $M_1$ and $M_2$ and the upsampled hyperspectral image $\hat{H}_i$ into a three-dimensional form along a spectral dimension, and splitting the three-dimensional form into full-band blocks with both a width and a height being $\sqrt{c}$ and the spectral dimension being l.

12. The device for generating the satellite remote-sensing image with high spatial, temporal and spectral resolutions according to claim 11, wherein in the step 5 of the method for generating the satellite remote-sensing image with high spatial, temporal and spectral resolutions, the observation models of the multispectral image, the hyperspectral image, and the image with high spatial, temporal and spectral resolutions are represented as follows:

$$M_i = RX_i = RE_iA_i$$

$$H_i = X_iFS = E_iA_iFS$$

wherein $i \in \{1,2\}$; $X_i \in \mathbb{R}^{L \times W}$, $H_i \in \mathbb{R}^{L \times w}$, and $M_i \in \mathbb{R}^{l \times W}$ respectively represent an image with high spatial, temporal and spectral resolutions, a hyperspectral image, and a multispectral image at a time point $T_i$; $E_i \in \mathbb{R}^{L \times Q}$ and $A_i \in \mathbb{R}^{Q \times W}$ respectively represent an endmember matrix and an abundance matrix of the image with high spatial, temporal and spectral resolutions at the time point $T_i$, and Q represents a quantity of endmembers; and $R \in \mathbb{R}^{l \times L}$ represents a spectral downsampling matrix, and $F \in \mathbb{R}^{W \times W}$ and $S \in \mathbb{R}^{W \times w}$ respectively represent a spatial blur matrix and a spatial downsampling matrix.

13. The device for generating the satellite remote-sensing image with high spatial, temporal and spectral resolutions according to claim 12, wherein the step 7 of the method for generating the satellite remote-sensing image with high spatial, temporal and spectral resolutions comprises:

step 7.1: separately introducing a regularization term of the abundance matrix $A_2$, a regularization term of the time variation matrix P and a regularization term of the time variation image T of the target image to obtain an energy function for a fusion problem;

step 7.2: splitting the energy function into three sub-functions corresponding to variables of the abundance matrix $A_2$, the time variation matrix P and the time variation image T, introducing a plurality of auxiliary variables for each sub-function to split the sub-function into sub-problems, and constructing an augmented Lagrangian function for each sub-problem; and step 7.3: using an alternating direction method of multipliers to perform optimal solving on the augmented Lagrangian function to obtain the abundance matrix $A_2$, the time variation matrix P and the time variation image T of the target image.

14. The device for generating the satellite remote-sensing image with high spatial, temporal and spectral resolutions according to claim 13, wherein in the step 7.1 of the method for generating the satellite remote-sensing image with high spatial, temporal and spectral resolutions, the energy function is represented as follows:

$$\arg\min_{A_2,P,T} \frac{1}{2}\|M_2 - R(PeE_1)A_2\|_2^2 + \frac{1}{2}\|D - R((PeE_1)A_2 - E_1A_1)\|_2^2 +$$

$$\frac{1}{2}\|RT - D\|_2^2 + \frac{1}{2}\|T - ((PeE_1)A_2 - E_1A_1)\|_2^2 + \Phi(A_2) + \Psi(P) + \Upsilon(T)$$

$$\text{s.t. } D = M_2 - M_1$$

wherein D represents a differential image of the multispectral images $M_2$ and $M_1$.

15. The device for generating the satellite remote-sensing image with high spatial, temporal and spectral resolutions according to claim 14, wherein the step 7.1 of the method for generating the satellite remote-sensing image with high spatial, temporal and spectral resolutions comprises:

step 7.1.1: introducing the regularization term of the abundance matrix $A_2$ of the target image, wherein the regularization term of the abundance matrix $A_2$ of the target image is a spatial smoothing constraint and represented as follows:

$$\Phi(A_2) = \frac{\lambda_A}{2}(\|H_hA_2\|_{2,1} + \|H_vA_2\|_{2,1})$$

wherein $H_h$ and $H_v$ represent linear operators respectively used to calculate horizontal and vertical gradients between components of adjacent pixels in a two-dimensional signal, $|\cdot|_{2,1}$ represents a mixed $L_{2,1}$ norm, and $\lambda_A$ represents a regularization parameter of the abundance matrix $A_2$;

step 7.1.2: introducing the regularization term of the time variation matrix P, wherein the regularization term of the time variation matrix P is a spectral smoothing constraint and represented as follows:

$$\Psi(P) = \frac{\lambda_1}{2}\left(\|H_\ell P\|_F^2 + \frac{\lambda_2}{2}\|P - 1_L 1_Q^T\|_F^2\right)$$

wherein $H_1$ represents a differential operator in a spectral dimension direction, $1_L 1_Q^T \in \mathbb{R}^{L \times Q}$ represents a matrix with all elements in L rows and Q columns being 1, and $\lambda_1$ and $\lambda_2$ represent regularization parameters of the time variation matrix P; and step 7.1.3: introducing the regularization term of the time variation image T, wherein the regularization term of the time variation image T is a low-rank constraint and represented as follows:

$$Y(T) = \lambda_T \|\mathcal{T}\|_{TNN}$$

wherein $\mathcal{T}$ represents a third-order tensor form of the T; $\|\cdot\|_{TNN}$ represents a tensor nuclear norm, with $$\|\mathcal{T}\|_{TNN} = \sum_{i=1}^{3}\sum_j \sigma_j(\overline{T}^{(i)}),$$

wherein $\sigma_j(\overline{T}^{(i)})$ represents a $j^{th}$ singular value of $\overline{T}^{(i)}$, and $\overline{T}$ is obtained by performing Fourier transform on the T; and $\lambda_T$ represents a regularization parameter of the time variation image T.

16. The device for generating the satellite remote-sensing image with high spatial, temporal and spectral resolutions according to claim 15, wherein in the step 7.2 of the method for generating the satellite remote-sensing image with high spatial, temporal and spectral resolutions, a sub-problem of the abundance matrix $A_2$ of the target image is as follows:

$$A_2 = \arg\min_{A_2}\frac{1}{2}\|M_2 - R(PeE_1)A_2\|_2^2 + \frac{1}{2}\|D - R((PeE_1)A_2 - E_1 A_1)\|_2^2 +$$
$$\frac{\eta}{2}\|T - ((PeE_1)A_2 - E_1 A_1)\|_2^2 + \frac{\lambda_A}{2}(\|H_h A_2\|_{2,1} + \|H_v A_2\|_{2,1})$$

wherein $\eta$ represents a term parameter of the time variation image and is used to control a contribution of the time variation image to a model; and
auxiliary variables $B_1 = A_2$, $B_2 = H_h(A_1)$, and $B_3 = H_v(A_1)$ are introduced, $u = \text{vec}(A_2)$ is set, a symbol $\text{vec}(\cdot)$ represents a vectorization operation, and an augmented Lagrangian function for the sub-problem of the abundance matrix $A_2$ is given as follows:

$$\mathcal{L}(u, B_1, B_2, B_3, V_1, V_2, V_3) = \frac{1}{2}\|\text{vec}(M_2) - \text{rep}_M(R(PeE_1)u)\|_2^2$$
$$+ \frac{1}{2}\|\text{vec}(D) - \text{rep}_M(R((PeE_1)u-)) + \text{vec}(E_1 A_1)\|_2^2$$
$$+ \frac{\eta}{2}\|\text{vec}(T) - \text{rep}_M((PeE_1)u) + \text{vec}(E_1 A_1)\|_2^2$$
$$+ \lambda_A(\|B_2\|^2 + \|B_3\|^2) + \frac{\rho}{2}(\|\text{vec}(B_1) - u + V_1\|_2^2$$
$$+ \|\text{vec}(B_2) - H_h \text{vec}(B_1) + V_2\|_2^2$$
$$+ \|\text{vec}(B_3) - H_v \text{vec}(B_1) + V_3\|_2^2)$$

wherein a matrix $V_i, i=1,2,3$ represents a dual variable of a Lagrangian function; $\rho$ represents a step size, wherein $\rho > 0$; and $\text{rep}_M(V)$ represents a block diagonal matrix of a matrix V and means copying the matrix V along a diagonal for M times.

17. The device for generating the satellite remote-sensing image with high spatial, temporal and spectral resolutions according to claim 16, wherein in the step 7.2 of the method for generating the satellite remote-sensing image with high spatial, temporal and spectral resolutions, a sub-problem of the time variation matrix P of the target image is as follows:

$$P = \arg\min_P \frac{1}{2}\|M_2 - R(PeE_1)A_2\|_2^2 + \frac{1}{2}\|D - R((PeE_1)A_2 - E_1 A_1)\|_2^2 +$$
$$\frac{1}{2}\|T - ((PeE_1)A_2 - E_1 A_1)\|_2^2 + \frac{\lambda_1}{2}\|P - 1_L 1_Q\|_2^2 + \frac{\lambda_2}{2}\|H_l P\|_2^2$$

an auxiliary variable $B = PeE_1$ is introduced, and an augmented Lagrangian function for the sub-problem of the time variation matrix P is as follows:

$$\mathcal{L}(B, P, V) = \frac{1}{2}\|M_2 - RBA_2\|_2^2 + \frac{1}{2}\|D - R(BA_2 - E_1 A_1)\|_2^2$$
$$+ \frac{\eta}{2}\|T - (BA_2 - E_1 A_1)\|_2^2$$
$$+ \frac{\lambda_1}{2}\|P - 1_L 1_Q\|_2^2 + \frac{\lambda_2}{2}\|H_l P\|_2^2$$
$$+ \frac{\rho}{2}(\|B - PeE_1 + V\|_2^2)$$

a sub-problem of the time variation image T of the target image is as follows:

$$T = \arg\min_T \frac{1}{2}\|RT - D\|_2^2 + \frac{1}{2}\|T - ((PeE_1)A_2 - E_1 A_1)\|_2^2 + _T\|\mathcal{T}\|_{TNN}$$

an auxiliary variable $\mathcal{B} = \mathcal{T}$ is introduced and an augmented Lagrangian function for the sub-problem of the time variation image T is as follows:

$$T = \arg\min_T \frac{1}{2}\|RT - D\|_2^2 + \frac{1}{2}\|T - ((PeE_1)A_2 - E_1 A_1)\|_2^2 + _T\|\mathcal{B}\|_{TNN}.$$

18. The device for generating the satellite remote-sensing image with high spatial, temporal and spectral resolutions according to claim 17, wherein in the step 2 of the method for generating the satellite remote-sensing image with high spatial, temporal and spectral resolutions, the image block centered at the (i, j) in the multispectral image $M_2$ is represented using the adjacent similar full-band block $M_1$ ($\Omega_{i,j,k}$) in the multispectral image $M_1$:

$$M_2(i, j) = \sum_{\Omega_{i,j,k} \in \Omega_{i,j}} \omega_{i,j,k} M_1(\Omega_{i,j,k}),$$

wherein $\omega_{i,j,k}$ represents a weight of a $k^{th}$ image block in the $\Omega_{i,j,k}$, and the $\omega_{i,j,k}$ is obtained based on the local linear constraint:

$$\min \|M_2(i,j) - M_1(\Omega_{i,j})\omega_{i,j}\|^2 + \lambda \|d_{i,j} e \omega_{i,j}\|^2$$

$$\text{s.t. } 1^T \omega_{i,j} = 1$$

wherein $\omega_{i,j}$ represents a weight corresponding to the image block $M_2(i,j)$, $\|d_{i,j} e \omega_{i,j}\|^2$ represents a regularization term of the local linear constraint, $d_{i,j}$ represents a Euclidean distance between a similar pixel and a center of $M_1(i, j)$, and $\lambda$ represents a regularization term parameter; and a solution to an optimization problem of the local linear constraint is as follows:

$$\omega_{i,j} = ((C_{i,j} + \lambda \text{diag}(d_{i,j})) \backslash 1)(1^T (C_{i,j} + \lambda \text{diag}(d_{i,j})) \backslash 1)^{-1}$$

wherein $C_{i,j} = (M_1(\Omega_{i,j}) - M_2(i,j)^T)(M_1(\Omega_{i,j}) - 1 M_2(i, j)^T)^T$ represents a covariance matrix of the image block, diag($d_{i,j}$) represents a diagonal matrix with $d_{i,j}$ being a diagonal element; afterwards, the weight $\omega_{i,j}$ obtained from the multispectral image is shared with the upsampled hyperspectral image $\hat{H}_1$ to generate the upsampled hyperspectral image $$\hat{H}_2^* = \sum_{\Omega_{i,j,k} \in \Omega_{i,j}} \omega_{i,j,k} \hat{H}_1(\Omega_{i,j,k})$$

at the prediction time point.

* * * * *